United States Patent [19]

Schauer

[11] Patent Number: 4,836,585
[45] Date of Patent: Jun. 6, 1989

[54] SHAPED FLANGE FOR CONNECTING AIR DUCT SEGMENTS

[76] Inventor: Markfried Schauer, Am Vogelbrink 3, D-3013 Barsinghausen, Fed. Rep. of Germany

[21] Appl. No.: 157,574
[22] PCT Filed: May 29, 1987
[86] PCT No.: PCT/DE87/00249
  § 371 Date: Feb. 2, 1988
  § 102(e) Date: Feb. 2, 1988
[87] PCT Pub. No.: WO87/07700
  PCT Pub. Date: Dec. 17, 1987

[30] Foreign Application Priority Data

Jun. 4, 1986 [DE] Fed. Rep. of Germany ....... 3618822

[51] Int. Cl.$^4$ .............................................. F16L 17/00
[52] U.S. Cl. ................................. 285/363; 285/379; 285/424; 285/906
[58] Field of Search ............... 285/424, 379, 108, 331, 285/906, 363

[56] References Cited

U.S. PATENT DOCUMENTS 2,314,386  3/1943  Brend .................. 285/379 X
3,955,834  5/1976  Ahlrot ................. 285/379 X
4,216,981  8/1980  Jensen ................. 285/347 X

FOREIGN PATENT DOCUMENTS 3207990  2/1983  Fed. Rep. of Germany .
3214693  2/1983  Fed. Rep. of Germany .
3436825  4/1986  Fed. Rep. of Germany .

Primary Examiner—Dave W. Arola
Attorney, Agent, or Firm—Peter K. Kontler

[57] ABSTRACT

A flange for connecting two air ducts to one another has a pair of spaced, generally parallel walls and a pair of spaced, generally parallel legs fast with, and extending perpendicular to, the walls. The flange legs are designed to embrace and grip a wall of an air duct while the flange walls define a chamber adapted to receive one leg of an angle serving to connect the flange to a neighboring flange. One of the flange legs is plastically deformed so as to define a cavity and has a surface facing the other flange leg. The cavity is open to this surface and accommodates an elastomeric seal which projects from the cavity to a location beyond the surface. The seal is elastically compressed in the cavity to retain the seal therein and such compression may be achieved by plastically deforming the respective flange leg after the seal has been positioned on the same.

19 Claims, 4 Drawing Sheets

SHAPED FLANGE FOR CONNECTING AIR DUCT SEGMENTS

BACKGROUND OF THE INVENTION

The invention relates to a shaped flange for connecting air duct segments.

In the production of ventilating and air conditioning ducts, air duct segments are connected to one another via shaped flanges. The shaped flanges are cut to size and connected to each other by means of corner angles. The shaped flanges are then drawn onto the air duct segments. The two portions of each shaped flange which are perpendicular to the front wall of the respective flange receive, that is, overlie and underlie, the associated wall of the air duct segment.

Among other criteria, it is important to assure that a seal exists between the sheet material wall of the air duct segment and the portion of the shaped flange which underlies this wall.

The West German Pat. No. 32 03 204 describes an arrangement of the type under consideration for connecting air duct elements which, at their abutting edges, are provided with shaped flanges defining receiving spaces for angled corner members. Here, it has been attempted to solve the sealing problem by providing a sealing ledge in that wall zone of the shaped flange which, during use, is parallel to the plane of, and faces away from, the seam. The desired sealing effect can, however, be obtained only if the sealing ledge bears against the front wall of the shaped flange in an airtight manner. This is impossible on production grounds.

The West German Offenlegungsschrift No. 23 53 625, which describes a butt joint different from the type under consideration for duct sections of sheet material, discloses a shaped flange which is placed on the edge of the respective duct side wall and secured by spot welds. The duct side walls are thus not inserted in corresponding receiving spaces of the shaped flange.

The legs of the shaped flange extending perpendicular to the duct walls are provided with sealing strips which are clamped by rolling. The sealing effect in this construction accordingly depends upon the installation of the duct segments and upon the clamping force of the clamping element which holds the shaped flanges together. Furthermore, the seal can be cut by the free front edges of the duct segments during assembly of the duct segments. In practice, precision installation of the duct segments is as good as impossible since tolerances of more than 5 mm are the rule.

SUMMARY OF THE INVENTION

It is an object of the invention to provide a shaped flange for connecting air duct segments which assures that the portion underlying the sheet material of the air duct segment forms an airtight seal with the wall of the air duct segment regardless of whether the front edges of the air duct segments lie in a common plane. Moreover, the seal is to be formed automatically upon application of the shaped flanges to the air duct segments.

This object of the invention is achieved by providing the flange portion located underneath the wall with a receiving space formed by shaping of the flange portion and having a seal of elastomeric material worked into the same. The free upper edge of the seal projects beyond the plane of the inner surface of the flange portion.

If, for example, the free end of that portion of the shaped flange which is to underlie the walls of the air duct segments is bent 180°, then a seal of elastic material can already be rolled into the thus-formed pocket during rolling of the shaped flanges.

During the rolling operation, the pocket with the seal may be inclined in such a manner that the upper edge of the pocket lies in the same plane as the inner surface of the flange portion which is to underlie the wall of the air duct segment. If the beginning of the seal, as seen in the direction of insertion of the wall of the air duct segment, is at a lower level than the upper edge of the pocket, the wall of the air duct segment can then be pushed between the overlying and underlying portions of the shaped flange with no problem and without damaging the seal of elastomeric material. Upon connecting the overlying and underlying portions of the shaped flange with the wall of the air duct segment by spot welding or pressure, the seal presses against the wall of the air duct segment and the underlying portion of the shaped flange is sealed relative to the wall of the air duct segment in an airtight fashion.

The pocket at the free end of the underlying flange portion additionally functions to increase the edge stability of the free end of this flange portion and thereby contributes significantly to the prevention of ripple formation at the edge of the flange portion.

Embodiments of the invention are described below with reference to the drawings.

DESCRIPTION OF THE PREFERRED EMBODIMENTS

Figure 5:
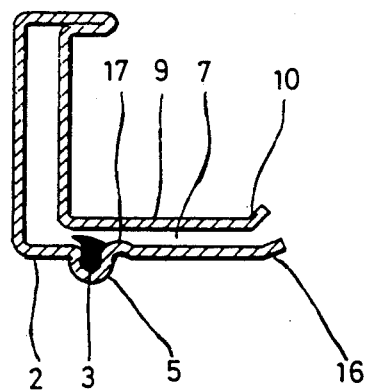
Figure 6:
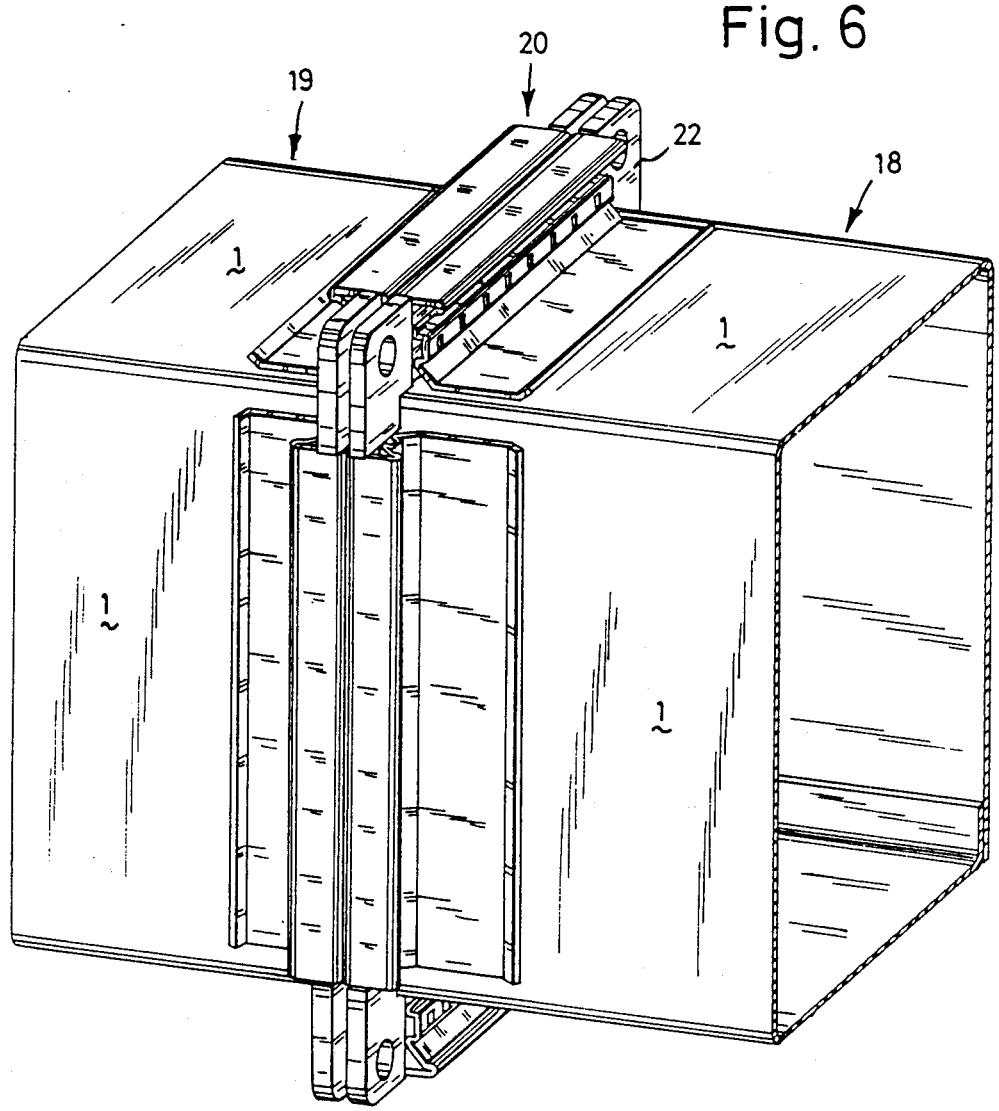
FIG. 6 is a perspective view of two assembled air duct segments.

In FIG. 6, the walls of air duct segments 18 and 19 are denoted by 1. Shaped flanges 20 are mounted on the free front ends of these walls 1 and are connected to one another via corner angles 22. The design of the shaped flanges is seen more clearly in FIGS. 1 to 5.

Figure 1:
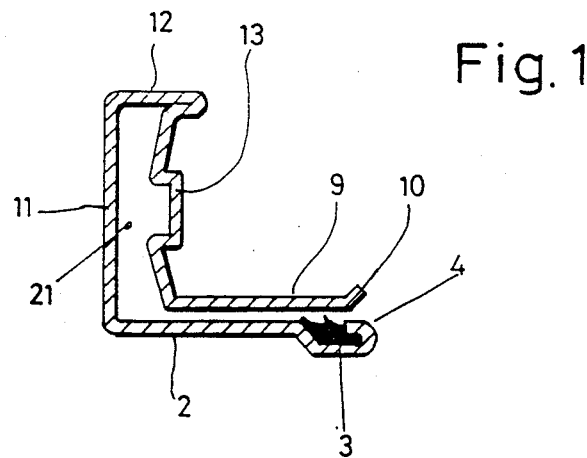
FIG. 1 is a cross section of a shaped flange with seal.

FIG. 1 shows a shaped flange 20 with a seal 3 of elastomeric material in cross section. A cavity 21 suitable for receiving the corner angles 22 is defined by the walls 11, 12, 13 and part of a flange portion 2. A flange portion 9 is arranged to overlie, while the flange portion 2 is arranged to underlie, the walls 1 of the air duct segments 18 and 19. The seal 3 is accommodated in a pocket 4 of the underlying flange portion 2 and is clamped by the pocket 4. The pocket 4 and an upwardly inclined edge 10 of the flange portion 9 form an entry funnel for the wall 1 of the air duct segment 18 or 19.

Figure 2:
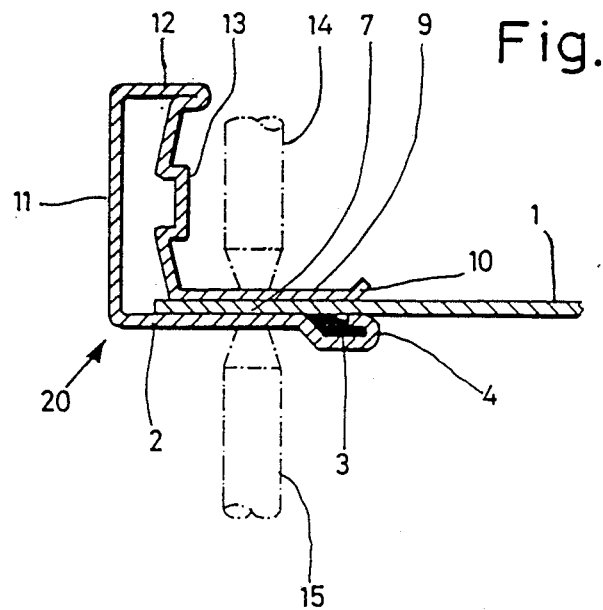
FIG. 2 is a cross section of a shaped flange with seal accommodating a wall of an air duct segment.

FIG. 2 shows the shaped flange 20 with the seal 3 after insertion of a wall 1 of the air duct segment and mounting of spot weld electrodes 14 and 15 which produces a spot weld connection at 7. The seal 3 clamped by the pocket 4 is pressed against the inserted wall 1 of the air duct segment and forms an airtight joint between the flange portion 2 and the inserted wall 1.

Figure 3:
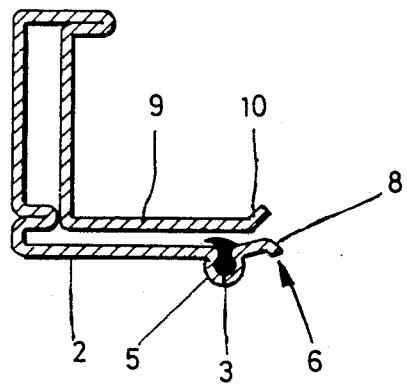
FIGS. 3, 4 and 5 are cross sections of variants of the shaped flange with seal

In FIG. 3, the seal 3 is located in a corrugation 5 at the free end of the flange portion 2. The upwardly inclined edge 10 of the flange portion 9 and the downwardly open arc 8 at the end 6 of the flange portion 2 define an entry funnel for the wall 1 of the air duct segment 18 or 19.

Figure 4:
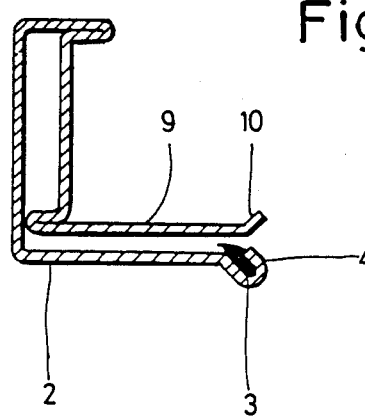

According to FIG. 4, the downwardly inclined pocket 4 with the clamped seal 3 is provided at the free end of the flange portion 2 and, together with the inclined edge 10 of the flange portion 9, forms the entry funnel for the wall of the air duct segment.

In FIG. 5, the seal 3 is accommodated in a corrugation 5 which is provided in the flange portion 2 at the front side of the spot weld connection 7. The end of the flange portion 2 has an upwardly turned edge 16. The end point of the slanted edge 16 and a projection 17 lie in a common plane to thereby insure that an inserted wall 1 of the air duct segment 18 or 19 is parallel to the flange portions 2 and 9.

In addition, as is the case in the embodiments of FIGS. 3 and 4, the projection 17 protects the seal 3 when the wall 1 of the air duct segment 18 or 19 is pushed in. The entry funnel for the wall of the air duct segment is defined by the inclined edge 10 of the flange portion 9 and the lesser inclined slanted edge 16 of the flange portion 2.

I claim:

1. A flange for connecting a pair of air ducts to one another, comprising a pair of legs designed to embrace a wall of an air duct, one of said legs having a portion which is plastically deformed so as to define a cavity, and said one leg having a surface which confronts the other of said legs, said cavity being open to said surface; and a resilient seal in said cavity, said portion of said one leg maintaining said seal in an elastically deformed condition to thereby retain said seal in said cavity, and said seal projecting from said cavity beond said surface.

2. The flange of claim 1, wherein said seal is maintained in an elastically deformed condition due to the plastic deformation of said one leg.

3. The flange of claim 1, wherein said seal comprises an elastomeric material.

4. The flange of claim 1, wherein said other leg has a free marginal portion which is inclined away from said one leg.

5. The flange of claim 1, wherein said legs are spaced from, and generally parallel to, one another.

6. The flange of claim 5, further comprising a pair of walls extending generally perpendicular to said legs, each wall of said pair being fast with a respective leg, and said walls of said pair being spaced from one another so as to define a chamber adapted to receive a leg of an angle designed to connect said flange with a neighboring flange.

7. The flange of claim 6, wherein said legs and said walls of said pair are metallic.

8. The flange of claim 1, wherein said one leg has a free marginal portion which is bent to define said cavity and clamps said seal.

9. The flange of claim 8, wherein said marginal portion is bent approximately 180°.

10. The flange of claim 1, wherein said one leg is provided with a corrugation which defines said cavity.

11. The flange of claim 1, wherein said one leg has a free marginal portion which is bent to define said cavity, said marginal portion having an edge which is directed towards said other leg and is located in a common plane with said surface.

12. The flange of claim 1, said surface being located in a predetermined plane; and wherein said one leg has a free marginal portion which is bent to define said cavity, said marginal portion having an edge which is directed, and is offset from said plane in a direction, towards said other leg.

13. The flange of claim 12, wherein said edge extends generally parallel to said surface.

14. The flange of claim 1, said surface being located in a predetermined plane; and wherein said one leg has a free marginal portion which is bent to define said cavity and is inclined with respect to said plane.

15. The flangeof claim 1, said surface being located in a predetermined plane; and wherein said one leg has a free marginal portion and is provided with a corrugation which defines said cavity and is located adjacent to said marginal portion, said marginal portion being inclined with respect to said plane.

16. The flange of claim 15, wherein said marginal portion is inclined in a direction towards said other leg.

17. The flange of claim 15, wherein said marginal portion is bent in a direction away from said other leg.

18. The flange of claim 15, wherein said marginal portion has a first part which is adjacent to said corrugation and is inclined towards said other leg, and a second part extending from said first part in a direction away from said other leg.

19. A joint between a pair of air ducts, comprising a metallic first flange having an at least approximately L-shaped cross section, said first flange including a pair of spaced, generally parallel first legs, and a pair of first walls extending generally perpendicular to said first legs, one of said first walls being fast with one of said first legs and the other of said first walls being fast with the other of said first legs, said first walls being spaced from one another so as to define a chamber adapted to receive a second leg of an angle for connecting said first flange with a neighboring second flange, and said one first leg having a first portion which is plastically deformed so as to define a corrugation in the region of said other first wall, said one first leg having a surface which confronts said other first leg and said corrugation being open to said surface, said first flange further including an elastomeric seal which is received by said corrugation in an elastically deformed condition due to having been clamped in said corrugation during plastic deformation of said first portion, and said seal projecting from said corrugation beyond said surface, said one first leg having a first free marginal portion which is spaced from said one first wall, and said corrugation having a first side remote from and a second side nearer to said first marginal portion, said one first leg having another portion which is disposed adjacent to said second side and is plastically deformed so as to define a protuberance projecting beyond said surface, and said other first leg having a second free marginal portion which is inclined away from said one first leg; an air duct having a second wall which is received between said first legs; and a weld connecting said second wall to said first legs, said weld being located between said corrugation and said free marginal portions.

* * * * *